US012667065B1

(12) United States Patent
Team et al.

(10) Patent No.: US 12,667,065 B1
(45) Date of Patent: Jun. 30, 2026

(54) SELF-WATERING PLANTER FOR USE WITH FLOOD FLOORS

(71) Applicant: Classic Home & Garden, LLC, Shelton, CT (US)

(72) Inventors: Hamilton Scott Team, Roswell, GA (US); Maite Patino, Derby, CT (US)

(73) Assignee: CLASSIC HOME & GARDEN, LLC, Shelton, CT (US)

( * ) Notice: Subject to any disclaimer, the term of this patent is extended or adjusted under 35 U.S.C. 154(b) by 0 days.

(21) Appl. No.: 19/047,890

(22) Filed: Feb. 7, 2025

(51) Int. Cl.
　　*A01G 27/00*　　(2006.01)
　　*A01G 27/02*　　(2006.01)

(52) U.S. Cl.
　　CPC ........... *A01G 27/008* (2013.01); *A01G 27/02* (2013.01)

(58) Field of Classification Search
　　CPC ...... A01G 27/00; A01G 27/008; A01G 27/06;
　　　　　　A01G 27/02; A01G 9/02; A01G 9/021
　　See application file for complete search history.

(56) References Cited

U.S. PATENT DOCUMENTS

| | | | | |
|---|---|---|---|---|
| 1,775,831 A | * | 9/1930 | Salisbury | A01G 9/021 |
| | | | | 47/65.5 |
| 4,173,097 A | * | 11/1979 | Staby | A01G 9/021 |
| | | | | 47/65.5 |
| 4,739,581 A | * | 4/1988 | Jarvis | A01G 9/02 |
| | | | | 47/79 |

| | | | | |
|---|---|---|---|---|
| 11,343,975 B2 | * | 5/2022 | Van Helleputte | A01G 9/021 |
| 2002/0174599 A1 | * | 11/2002 | Rose | A01G 9/02 |
| | | | | 47/65.6 |
| 2004/0144026 A1 | * | 7/2004 | Fan | A01G 9/02 |
| | | | | 47/65.5 |
| 2013/0067811 A1 | * | 3/2013 | Baker | A01G 9/024 |
| | | | | 47/81 |
| 2015/0143748 A1 | * | 5/2015 | Donnelly | A01G 27/06 |
| | | | | 47/79 |
| 2019/0183063 A1 | * | 6/2019 | Ryan | A01G 9/02 |
| 2020/0077606 A1 | * | 3/2020 | Hung | A01G 27/06 |
| 2020/0245566 A1 | * | 8/2020 | Hung | A01G 9/042 |
| 2020/0337247 A1 | * | 10/2020 | Ryan | A01G 9/02 |

FOREIGN PATENT DOCUMENTS

| | | | | | | |
|---|---|---|---|---|---|---|
| CA | 2998235 A1 | * | 9/2018 | ......... | A01G 9/0297 |
| CN | 107969250 A | * | 5/2018 | ............. | A01G 9/02 |
| CN | 208242323 U | * | 12/2018 | | |
| CN | 208370407 U | * | 1/2019 | | |
| CN | 208675869 U | * | 4/2019 | ......... | A01G 27/02 |
| CN | 112106566 A | * | 12/2020 | ............. | A01G 9/02 |
| CN | 216058419 U | * | 3/2022 | | |

(Continued)

*Primary Examiner* — Monica L Perry
*Assistant Examiner* — Aaron M Rodziwicz
(74) *Attorney, Agent, or Firm* — Tutunjian & Bitetto, P.C.

(57) ABSTRACT

A self-watering planter includes an interior cavity defined by a wall and a bottom surface and a drainage riser extending from the bottom surface within the interior cavity. The drainage riser has a centrally disposed drainage opening and a vertically disposed slit in fluid communication with the centrally disposed drainage opening. A recess is formed on an external portion of the bottom surface. The recess is configured to form a channel when the planter interfaces with a supporting surface, wherein the centrally disposed drainage opening is in fluid communication with the channel.

20 Claims, 7 Drawing Sheets

(56)     References Cited

FOREIGN PATENT DOCUMENTS

| | | | | | | |
|---|---|---|---|---|---|---|
| CN | 216218987 | U | * | 4/2022 | | |
| DE | 202012010227 | U1 | * | 12/2012 | ............ | A01G 27/04 |
| EP | 1527676 | A2 | * | 5/2005 | ............ | A01G 9/021 |
| EP | 1958498 | A1 | * | 8/2008 | ............. | A01G 9/02 |
| EP | 2499903 | A1 | * | 9/2012 | ............ | A01G 9/021 |
| KR | 850000557 | Y1 | * | 4/1985 | ............ | A01G 9/021 |
| KR | 940002892 | Y1 | * | 5/1994 | ............ | A01G 27/06 |
| KR | 20200005200 | A | * | 1/2020 | ............ | A01G 27/02 |
| WO | WO-2018006123 | A1 | * | 1/2018 | ............ | A01G 9/021 |
| WO | WO-2020163168 | A1 | * | 8/2020 | ............. | A01G 9/02 |
| WO | WO-2024050613 | A1 | * | 3/2024 | ............. | A01G 9/02 |

* cited by examiner

SELF-WATERING PLANTER FOR USE WITH FLOOD FLOORS

BACKGROUND

Technical Field

The present invention relates to planters, and more particularly to self-watering planters that permit underside watering and water storage.

Description of the Related Art

Planters provide a decorative element in outside or inside environments. Planters can become cumbersome when the planter itself is large, made from dense materials, like concrete, and is filled with soil, especially wet soil. Traditional planters can face challenges in maintaining optimal moisture levels, particularly in varying environmental conditions or when used with different plant species. Some systems may not adequately address issues such as proper drainage, aeration of the root zone, or the prevention of waterlogging, which can lead to root rot and other plant health problems.

Additionally, many planters are not well-suited for use in commercial growing operations or in situations where large numbers of plants need to be maintained efficiently. The ability to integrate with existing irrigation systems or to function effectively in flood floor environments commonly used in greenhouses can be limited in many conventional designs.

SUMMARY

In accordance with an embodiment of the present invention, a self-watering planter includes an interior cavity defined by a wall and a bottom surface. At least one drainage riser extends from the bottom surface within the interior cavity. The drainage riser has a centrally disposed drainage opening and at least one vertically disposed slit in fluid communication with the centrally disposed drainage opening. A recess is formed on an external portion of the bottom surface. The recess is configured to form at least one channel when the planter interfaces with a supporting surface, wherein the centrally disposed drainage opening is in fluid communication with the at least one channel.

In accordance with another embodiment of the present invention, a self-watering planter includes an interior cavity defined by a wall and a bottom surface. A plurality of drainage risers extend from the bottom surface within the interior cavity. Each drainage riser has a tapered shape, a centrally disposed drainage opening, and a plurality of vertically disposed slits in fluid communication with the centrally disposed drainage opening. A recess is formed on an external portion of the bottom surface, the recess configured to form a cross-shaped channel when the planter interfaces with a supporting surface, wherein the centrally disposed drainage openings are in fluid communication with the cross-shaped channel. A reservoir region is formed between the bottom surface and a lower edge of the vertically disposed slits to store water. A centrally disposed support structure is disposed in a central region on the external portion of the bottom surface, the centrally disposed support structure configured to prevent sag to maintain the cross-shaped channel when the planter interfaces with the supporting surface.

In accordance with another embodiment of the present invention, a self-watering planter includes an interior cavity defined by a wall and a bottom surface and a plurality of conical drainage risers extending from the bottom surface within the interior cavity. Each drainage riser has a centrally disposed drainage opening and vertically disposed slits in fluid communication with the centrally disposed drainage opening. A cross-shaped recess is formed on an external portion of the bottom surface. The recess is configured to form a cross-shaped channel when the planter interfaces with a supporting surface, wherein the centrally disposed drainage openings are in fluid communication with the cross-shaped channel. A reservoir region is formed between the bottom surface and a lower edge of the vertically disposed slits to store water. A permeable tray is supported above the bottom surface by a plurality of supports and configured to receive a plant or growing medium, the permeable tray including a plurality of perforations to allow water and air flow. A centrally disposed support structure is disposed in a central region on the external portion of the bottom surface within the cross-shaped recess. The centrally disposed support structure is configured to prevent sag to maintain the cross-shaped channel when the planter interfaces with the supporting surface. Peripheral supports are disposed on the external portion of the bottom surface, wherein the peripheral supports and the centrally disposed support structure include feet to provide stability and extend a clearance distance with the supporting surface.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein:

FIG. 4 is a bottom view of the self-watering planter of FIG. 1 showing a tray having perforations therein to permit water and air flow, in accordance with an embodiment of the present invention;

DETAILED DESCRIPTION

Figure 1:
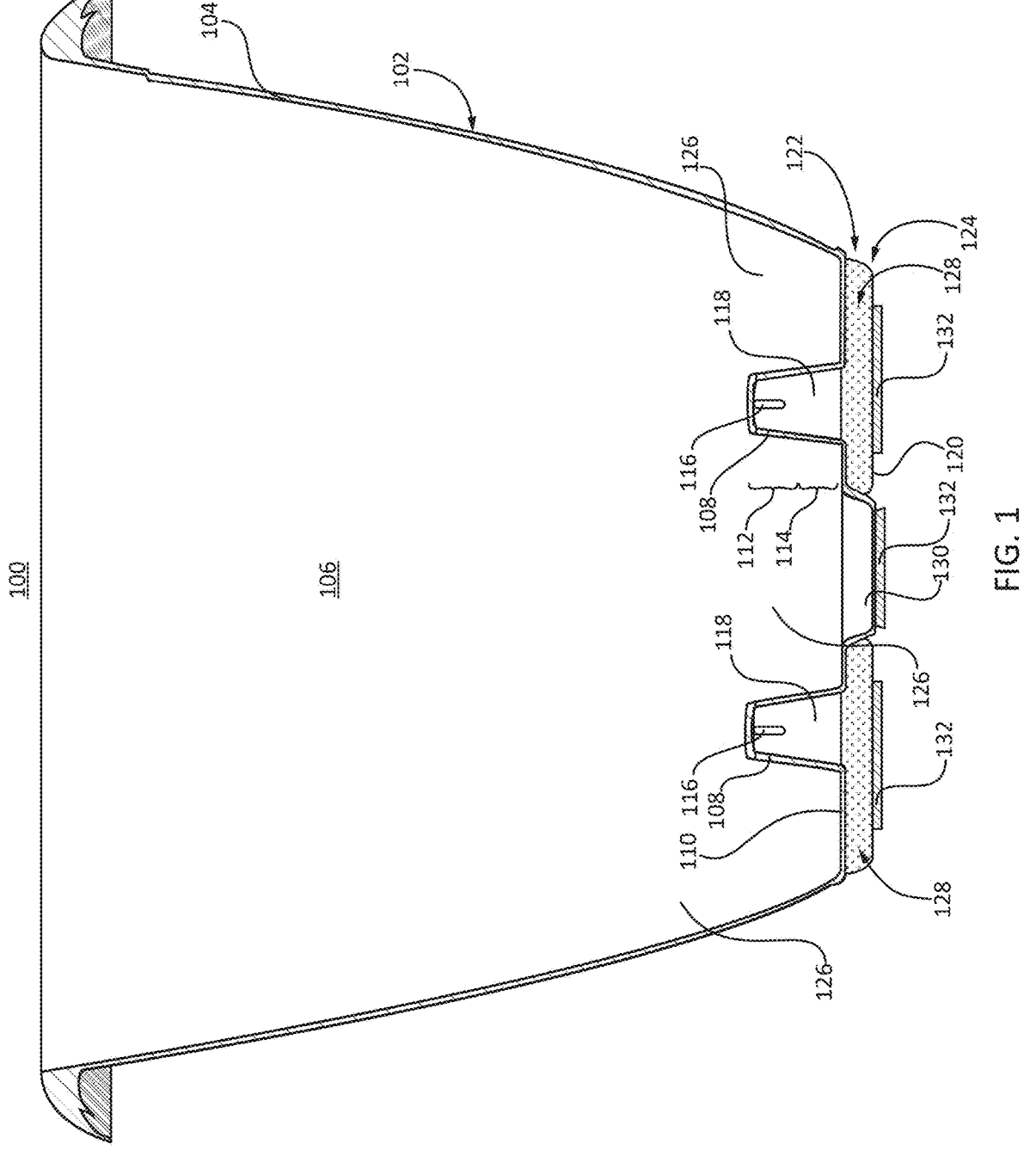
FIG. 1 is a cross-sectional view of a self-watering planter having features for bottom or flood watering and water storage, in accordance with an embodiment of the present invention.

In accordance with the present principles, self-watering planters are provided that include flood floor friendly features. The planters can be employed in any capacity including typical uses. In particularly useful embodiments, the self-watering planters can include features that permit greater access to water without subjecting plant roots to flooding. The self-watering planter includes features that assist in keeping pathways for floor flood water open and to maintain water in a reservoir without flooding the roots of a plant within the self-watering planter.

In an embodiment, one or more drainage risers are included internally within an interior cavity of the self-watering planters. The drainage risers extend from a bottom surface within the cavity. The drainage risers are shaped to permit nesting and stacking of the self-watering planters. The drainage risers include an upper portion and a lower portion having a centrally disposed drainage opening that passes through the upper portion and the lower portion. Sidewalls of the drain risers include vertically disposed slits that fluidly communicate with the centrally disposed drainage opening. The centrally disposed drainage opening drains through the bottom of the self-watering planter. The centrally disposed drainage opening also provides a water source in a flood floor watering environment.

A flood floor watering system or ebb and flow system is an irrigation method where plants are periodically flooded with water, allowing the roots to absorb moisture. Excess water is gradually drained back to simulate a natural flooding cycle to promote healthy root development. The flood floor watering system can be employed in greenhouses and nurseries to efficiently water plants.

Water is released onto a floor (or a bench or a tray) where the planters are sitting. This permits the self-watering plants to become partially submerged are at least access water from a bottom of the self-watering planter. Then, excess water is drained away, creating a cycle of flooding and draining. This provides an even water distribution to ensure that all plants receive a consistent amount of water. The access to water from the bottom up provides for deep root development and encourages roots to grow deeper into the soil, leading to better plant stability. The flood floor system includes better water efficiency as well since the flood floor system can reuse the water by recirculating the water, minimizing waste. Proper drainage is an important aspect to prevent root rot from overly saturated soil.

In an embodiment, an external portion of the bottom of the self-watering planter includes a centrally disposed recess that forms a channel or channels when the self-watering planter interfaces with a floor. Openings to the channels are enlarged to accommodate floor water input and drainage without clogging. Peripheral supports are disposed on the external portion of the bottom of the self-watering planter, and a centrally disposed support provides support in a middle portion of the bottom of the self-watering planter. The centrally disposed support is located on the external portion of the bottom of the self-watering planter within the recess to ensure that the channels remain open and do not sag to cut off water flow under the weight of saturated soil in the self-watering planter.

When the self-watering planter is subjected to watering using the floor flooding system, water travels through the openings and channels of the recess and into the central opening of the drainage risers and the vertically disposed slits therein. Water fills the cavity at the bottom of the self-watering planter up to a lower portion of the vertically disposed slits. Water can drain from the self-watering planter through the vertically disposed slits and through the channel in the recess. The cavity of the self-watering planter includes a reservoir that can store some of the water to provide hydration to a plant within the self-watering planter.

The self-watering planters in accordance with the present embodiments may be fabricated by molding processes using plastics; however, other materials are contemplated as well. For example, the self-watering planters may include metal construction, concrete, wood, etc. In an embodiment, the self-watering planters are a monolithic construction (e.g., one piece).

It is to be understood that the present invention will be described in terms of a given illustrative architecture; however, other architectures, structures, materials and process features and steps may be varied within the scope of the present invention.

It will also be understood that when an element such as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, may be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs. is turned over, elements described as "below" or "beneath" other elements or features would then be oriented "above" the other elements or features. Thus, the term "below" can encompass both an orientation of above and below. The device may be otherwise oriented (rotated 90 degrees or at other orientations), and the spatially relative descriptors used herein may be interpreted accordingly. In addition, it will also be understood that when a layer is referred to as being "between" two layers, it can be the only layer between the two layers, or one or more intervening layers may also be present.

It will be understood that, although the terms first, second, etc. may be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, a cross-sectional view of a self-watering planter 100 is shown in accordance with an embodiment. The self-watering planter 100 may include a flowerpot or other container for growing plants. The self-watering planter 100 is illustratively shown having a particular shape; however, it should be understood that the self-watering planter 100 may include any shape and may be scaled to any size. The self-watering planter 100 includes external surfaces 102 and a wall 104 that defines an interior space or cavity 106. Within the interior space or cavity 106, one or more drainage risers 108 are coupled to a bottom 110 or bottom surface of the self-watering planter 100. The drainage risers 108 may be connected to the bottom 110, be connected to the wall 104 or be connected in a combination of both or other manner. The drainage risers 108 can include a cylindrical shape, a conical shape as shown or include a tapered polygon or other shape. The drainage risers 108 preferably include a shape that permits nesting from one self-watering planter 100 to another so that the self-watering planters 100 can be stacked and nested one within the other. The drainage risers 108 include a centrally disposed drainage opening 118 therethrough.

The drainage risers 108 are included internally within the cavity 106 of the self-watering planter 100. The drainage risers 108 extend from a surface at the bottom 110 within the cavity 106. The drainage risers 108 include an upper portion 112 and a lower portion 114 having the centrally disposed drainage opening 118 that passes through the upper portion 112 and the lower portion 114. Sidewalls of the drain risers 108 include one or more vertically disposed slits 116 that fluidly communicate with the centrally disposed drainage opening 118. The centrally disposed drainage opening 118 permits influx or water in a flood floor configuration and permits drainage through the bottom 110 of the self-watering planter 100. The centrally disposed drainage opening 118 permits drainage of water through the slits 116 and into a channel 120 that is formed in a recess 122. The recess 122 forms openings 124 that permit water flow therethrough during operation. The recess 122 provides a channel or space under the planter 100 that permits water to flow between an outer surface (wall 104) of the planter 100 under the planter 100 and into the centrally disposed drainage openings 118.

The slits 116 can be vertically disposed and provide a dimensional range and cross-sectional area that can be designed to provide a time scale for drainage or water above the slit 116 during operation. The slits 116 can be arranged with a width, a height and a number of slits 116 to permit different drainage rates. Caps or other obstructions can be employed to cover portions of the slits 116. The slits can include diagonal portions, horizontal portions or include other opening shapes (e.g., crosses, circles, polygons, etc.).

The slits 116 in the drainage risers 108 can be configured in various ways to adjust the drainage characteristics of the self-watering planter 100. The configuration of these slits 116 can control water flow and retention within the self-watering planter 100. The slits 116 can be designed in advance for a particular application (plant to planter design). The width of the slits 116 can be varied to control the rate of water flow. Narrower slits will restrict water flow, allowing for slower drainage and potentially longer water retention in the reservoir 126. Wider slits 116 will facilitate faster drainage, which may be beneficial in environments with frequent watering or for plants that prefer less moisture. Adjusting the vertical length of the slits 116 can change the volume of water that can be held in the reservoir 126. Longer slits 116 that extend further down the drainage riser 108 will allow for a lower water level in the reservoir 126, while shorter slits 116 will maintain a higher water level. Increasing or decreasing the number of slits 116 on each drainage riser 108 can affect the overall drainage capacity. More slits 116 will allow for faster drainage and potentially better aeration, while fewer slits will slow down drainage and increase water retention. The arrangement of slits 116 around the drainage riser 108 can be designed. For example, slits 116 could be arranged in a spiral pattern, staggered vertically, or grouped in specific areas to influence water distribution within the planter. While vertical slits 116 are described, the shape of the openings can be varied. Curved slits, horizontal slits, or even small holes could be used to create different drainage patterns and rates. Adjustable covers or caps (not shown) can be placed over the slits 116 to provide reduced cross-sectional area of the slit openings. Other methods and material (e.g., clay) can be employed to reduce the slit size. Removable or sliding covers could be incorporated over the slits 116, allowing users to manually adjust the exposed slit area after the self-watering planter 100 has been fabricated. This would provide a way to customize drainage based on specific plant needs or changing environmental conditions. In an embodiment, the cap (e.g., like a pen cap) would fit over a top of the riser(s) 108.

The slits 116 could be designed with varying widths or lengths along the height of the drainage riser 108 (e.g., graduated slit sizes). This could create a natural gradient of drainage rates, with faster drainage at the top and slower drainage near the bottom of the reservoir 126. Instead of purely vertical slits, angled slits could be incorporated to direct water flow in specific directions or to slow down the rate of drainage. By carefully designing and configuring these slit characteristics, the self-watering planter 100 can be optimized for different types of plants, growing conditions, and watering regimes. This can permit a single planter design to accommodate a wide range of horticultural needs, from moisture-loving plants to those requiring well-drained conditions.

In a flood floor facility, water is released onto a surface which supports the self-watering planter(s) 100 and partially submerges at least a lower portion of the self-watering planter(s) 100. The water level can be set to a level of the slits 116 to permit water to flow through the openings 124 into the channel 120 and into the centrally disposed drainage opening 118. The channel 120 is formed in a space between the floor and a bottom exterior portion of the bottom 110 of the planter 100. As water rises, water is then distributed through the slits 116. Water from the slits 116 saturates the soil and water from the slits 116 fills a region of a reservoir 126 below the slits 116 within the cavity 106. Then, excess water is drained away when the flood water level drops below the level of the slits 116. The access to water from the bottom up provides for deep root development and encourages roots to grow deeper into the soil, leading to better plant stability.

Peripheral supports 128 (shown with a stipple texture in FIG. 1) are disposed on an external portion of the bottom 110 of the self-watering planter 100, and a centrally disposed support 130 provides support in a middle portion of the bottom 110 of the self-watering planter 100. Peripheral supports 128 and centrally disposed support 130 are raised from the exterior surface of the bottom 110 and form the channel 120. The centrally disposed support 130 is located on the external portion of the bottom 110 of the self-watering planter 100 within the recess 122 to ensure that the channels 120 remain open and do not get reduced in size to sag of the bottom 110 under the weight of soil and plant life within the self-watering planter 100 as significant sag could cause a deflection of the bottom 110 and cut off water flow under the weight of saturated soil in the self-watering planter 100.

Figure 2:
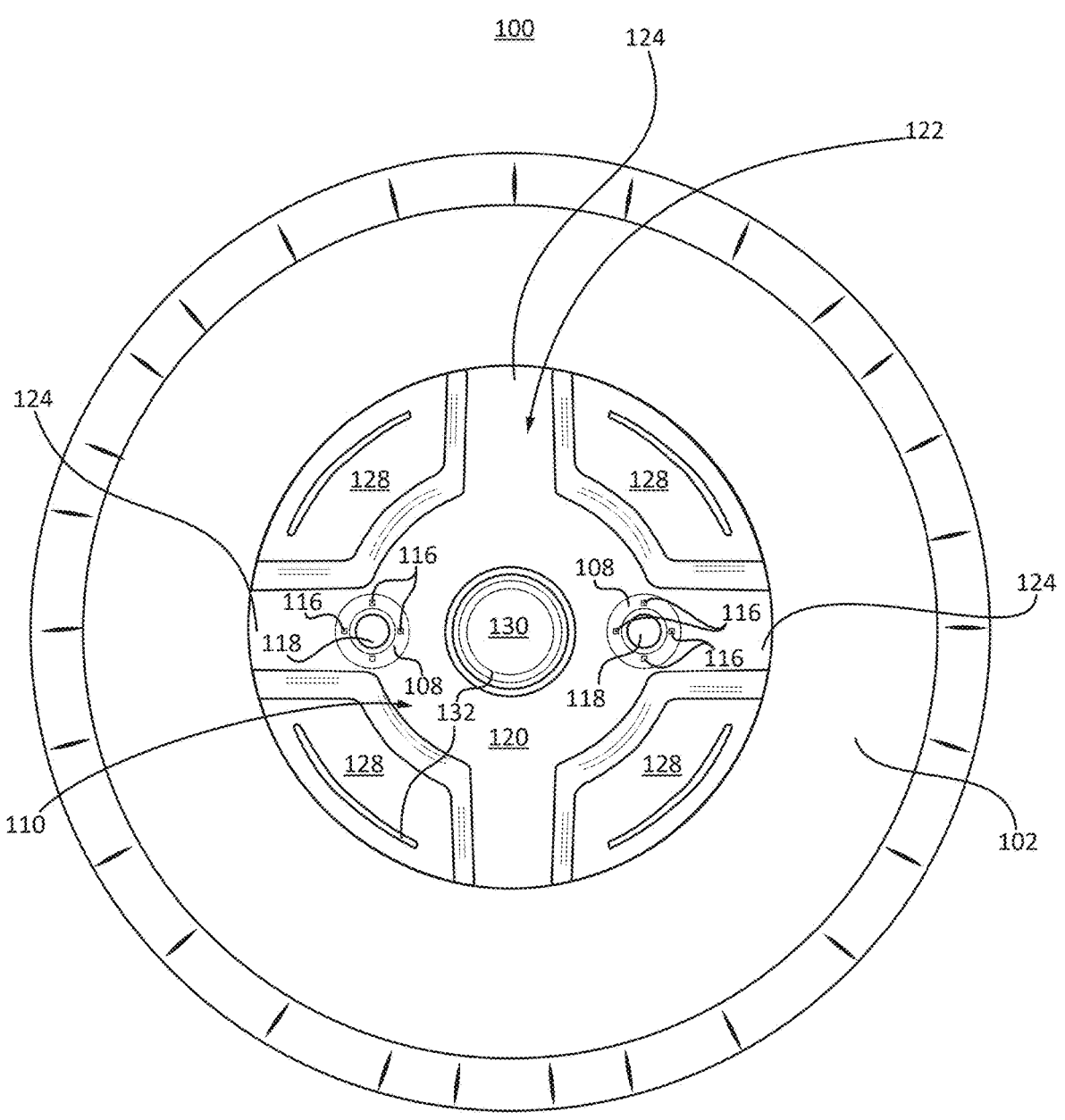
FIG. 2 is a bottom view of the self-watering planter of FIG. 1 showing a recess forming a channel to permit improved water flow, in accordance with an embodiment of the present invention.

Referring to FIG. 2, an exterior of the self-watering planter is shown. The self-watering planter 100 includes the recess 122 that forms one or more channels 120 when the self-watering planter 100 interfaces with a surface (e.g., a floor). Openings 124 to the channels 120 can be enlarged to accommodate floor water input and drainage without clogging. The openings 124 at the ends of the channels 120 can be designed to be larger than the channels 120 themselves. This enlargement can provide improved water intake. Larger openings 124 facilitate easier and faster water intake and drainage during and after flood floor watering and provide clog prevention. Larger openings 124 are less likely to become clogged with debris, soil particles, or mineral deposits. This helps maintain the planter's functionality over time and reduces the need for frequent cleaning or maintenance. The enlarged openings 124 can also promote better air circulation within the channels and drainage system. The size of these enlarged openings 124 can be optimized based on the overall dimensions of the self-watering planter 100, the expected water flow rates, and the specific needs of the plants being grown. For example, the enlarged openings 124 can be tapered to increase a cross-sectional area of the enlarged openings 124 at its most external position. By carefully balancing the size of the openings with the dimensions of the channels 120, the self-watering planter 100 can achieve optimal water management capabilities.

The peripheral supports 128 are disposed on an external portion of the bottom 110 of the self-watering planter 100. The centrally disposed support 130 provides support in the middle portion of the bottom 110 of the self-watering planter 100. The peripheral supports 128 and the centrally disposed support 130 can include feet 132 that can be shaped to provide appropriate stability for the self-watering planter 100 and extend a clearance distance with the surface (e.g., floor). Feet 132 can include any shape. In an embodiment, feet 132 include a profile that follows a general shape of the support on which it is formed.

It should be understood that while the channel 120 is depicted having four openings 124, any number of openings 124 can be employed (e.g., 1, 2 . . . 6, 7, etc.). In addition, the channel 120 is illustratively depicted with a "cross" shape; however, the channel 120 can include any useful shape, e.g., a square, rectangle, triangle, etc.

Figure 3:
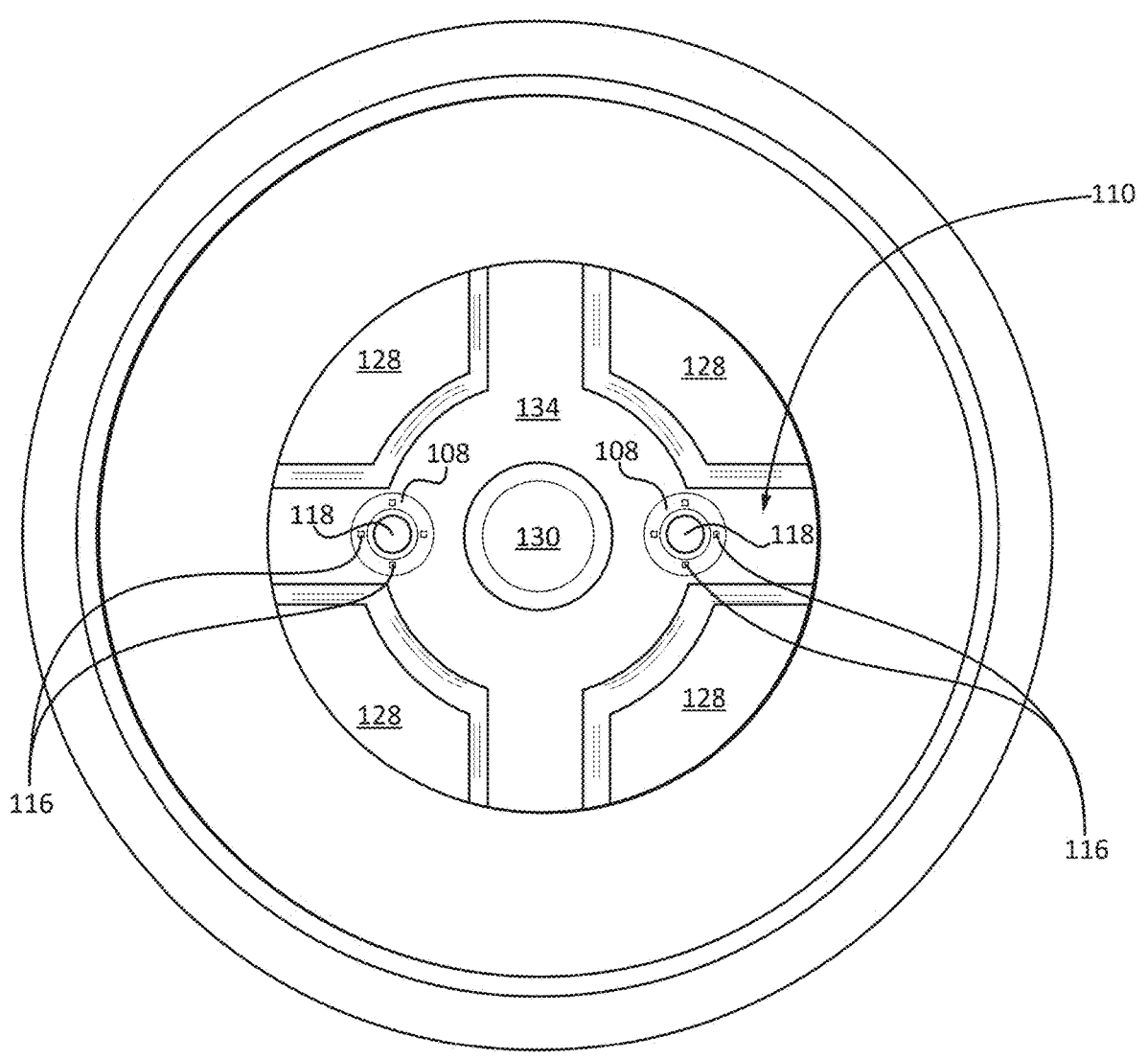
FIG. 3 is a top view of the self-watering planter of FIG. 1 showing drainage risers formed over the recess that forms the channel to permit improved water flow, in accordance with an embodiment of the present invention.

Referring to FIG. 3, an interior of the self-watering planter is shown. The self-watering planter 100 includes a raised portion 134 opposite the recess 122 that forms the one or more channels 120 on the exterior portion of the self-watering planter 100. The peripheral supports 128 are recessed into the bottom 110 as well as the centrally disposed support 130. The drainage risers 108 are formed on the raised portion 134 so that the centrally disposed opening 118 can drain into the channels 120 (FIG. 2). While the drainage risers 108 are shown directly over the channels 120 and the raised portion 134, it should be understood that only the centrally disposed opening 118 or portion thereof needs to be in fluid communication with the channel or channels 120.

Figure 4:
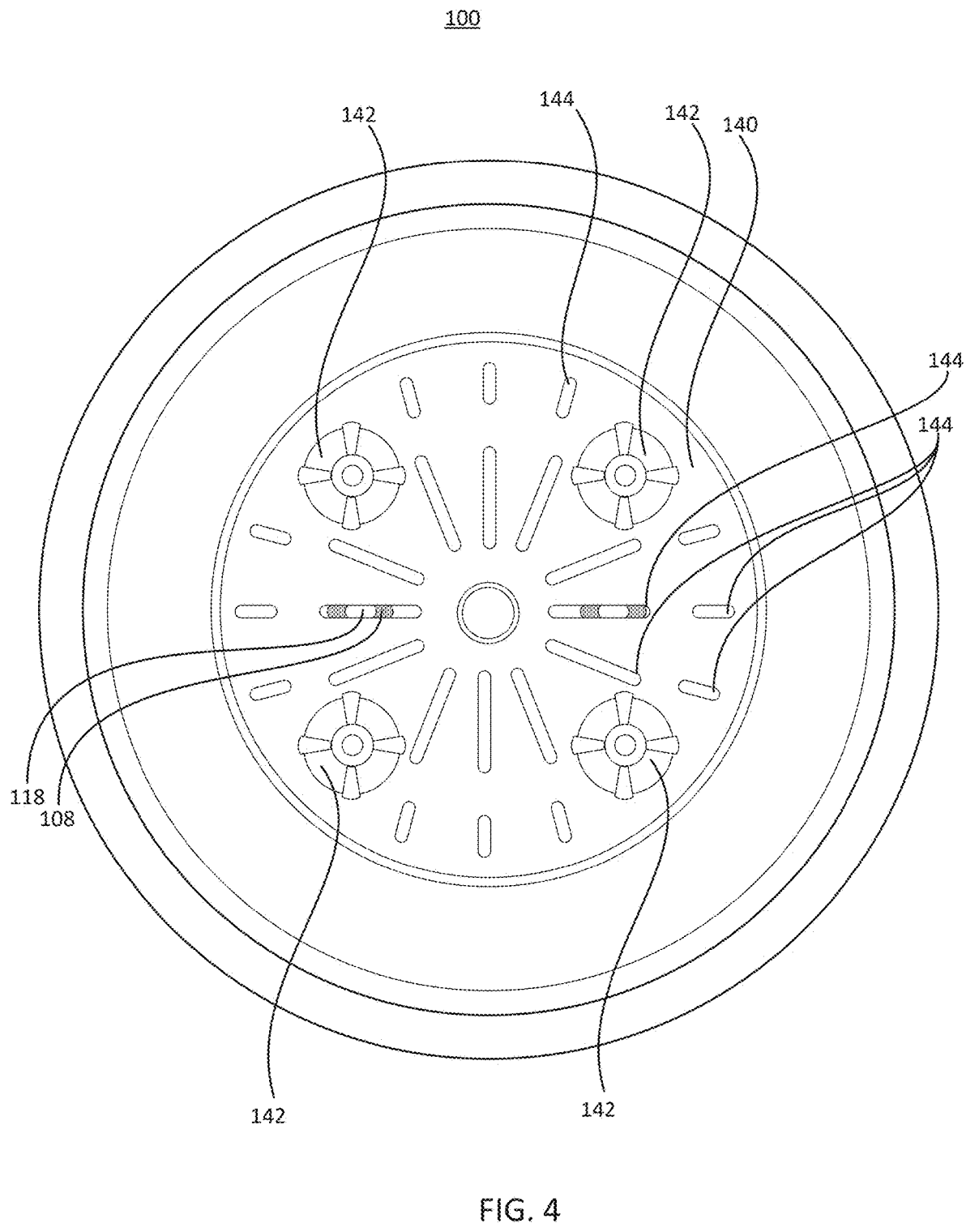

Referring to FIG. 4, a top view into the self-watering planter 100 is shown in accordance with another embodiment. The self-watering planter 100 may include a tray 140 that is gapped from the bottom 110 (FIG. 1) of the self-watering planter 100 using supports 142. The tray 140 can rest on the bottom 110. The tray 140 may be connected to the bottom 110 or can be connected to the wall of the shelf-watering planter 100 or a combination of both. The tray 140 is permeable to permit water and air to flow. The tray 140 and the supports 142 can include any number of perforations 144 to provide permeability. The tray 140 provides an elevated portion, which can be configured to receive a plant or plants. The tray 140 reduces the internal space (volume of the cavity 106 (FIG. 1) of the self-watering planter 100. In this way, less soil or other media is needed to fill the self-watering planter 100. The supports 142 of the tray 140 provide enough clearance over the drainage risers 108 so as to not interfere with flow through the centrally disposed openings 118.

The tray 140 also acts as a barrier to prevent any potted plants from sitting directly in the reservoir 126 (FIG. 1), which can be full of water. In accordance with the present embodiments, the self-watering planter 100 preserves water. One way includes catching water in the reservoir 126 so that the water is available at the roots of the plant to provide a self-watering capability where water is made available to the root system of the plant.

Figure 5:
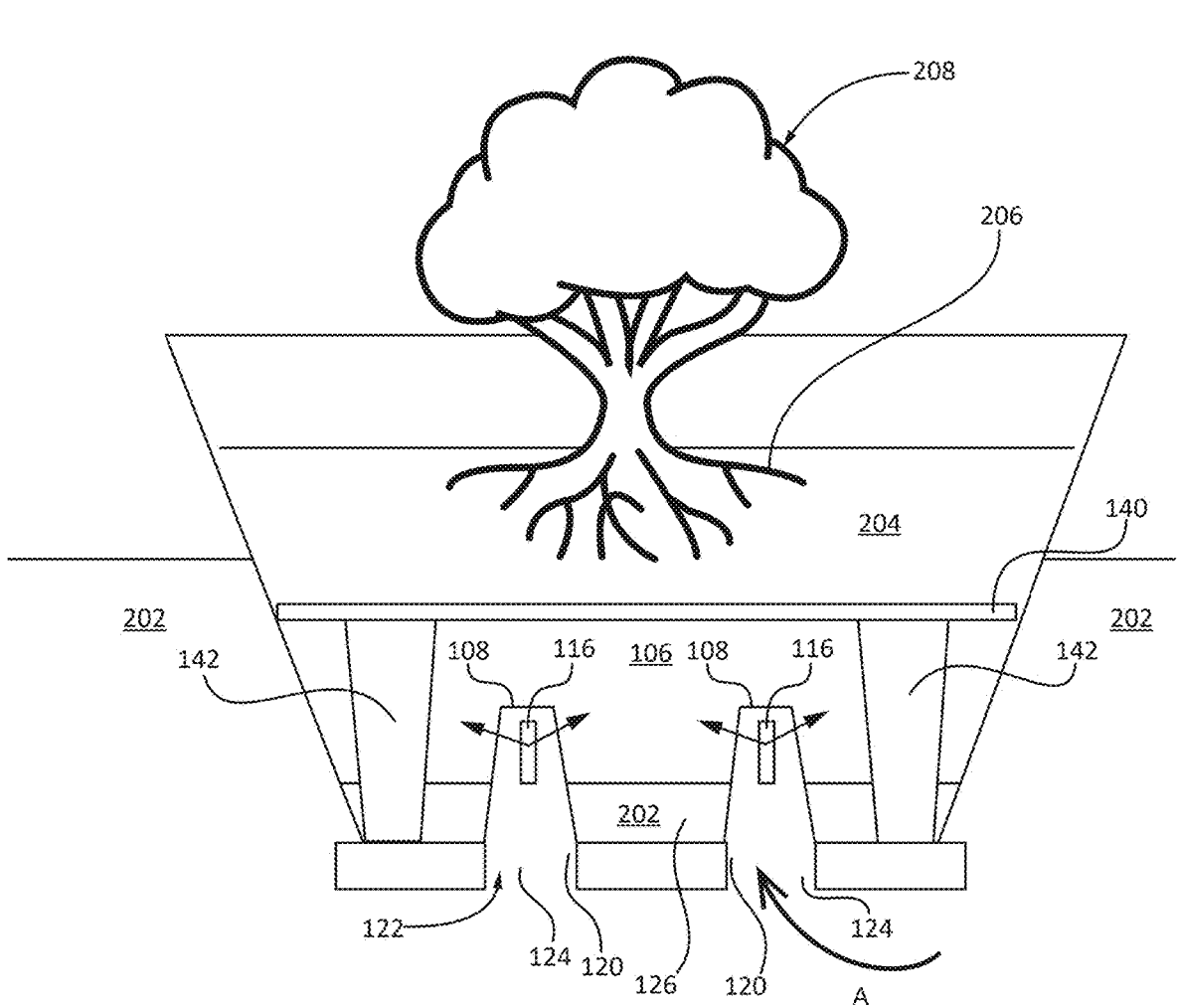
FIG. 5 is a schematic cross-sectional view of a self-watering planter showing water introduced from a bottom of the self-watering planter, in accordance with an embodiment of the present invention.

Referring to FIG. 5, when the self-watering planter 100 is subjected to watering using a flood floor system, water 202 may flow through various paths within the planter structure. In an embodiment, water 202 may enter the self-watering planter 100 through the openings 124 in the recess 122 shown by arrow "A") at the bottom 110 of the self-watering planter 100. The water 202 may then flow into the channels 120 formed by the recess 122.

From the channels 120, water 202 may travel upwards through the centrally disposed drainage openings 118 of the drainage risers 108. As the water level rises, it reaches the vertically disposed slits 116 in the sidewalls of the drainage risers 108. Water 202 may then flow through these slits 116 into the cavity 106. In some cases, water 202 flowing through the slits 116 may saturate soil 204 or growing medium in the self-watering planter 100. Excess water may collect in the region of the reservoir 126 below the level of the slits 116 within the cavity 106. This reservoir 126 may provide a source of water for plant roots 206 of a plant 208 over time.

In embodiments featuring the tray 140, water 202 may also flow through the perforations 144 in the tray 140 and its supports 142. This allows water to reach the soil 204 or growing medium to water the plant 208 from the roots 206.

Figure 6:
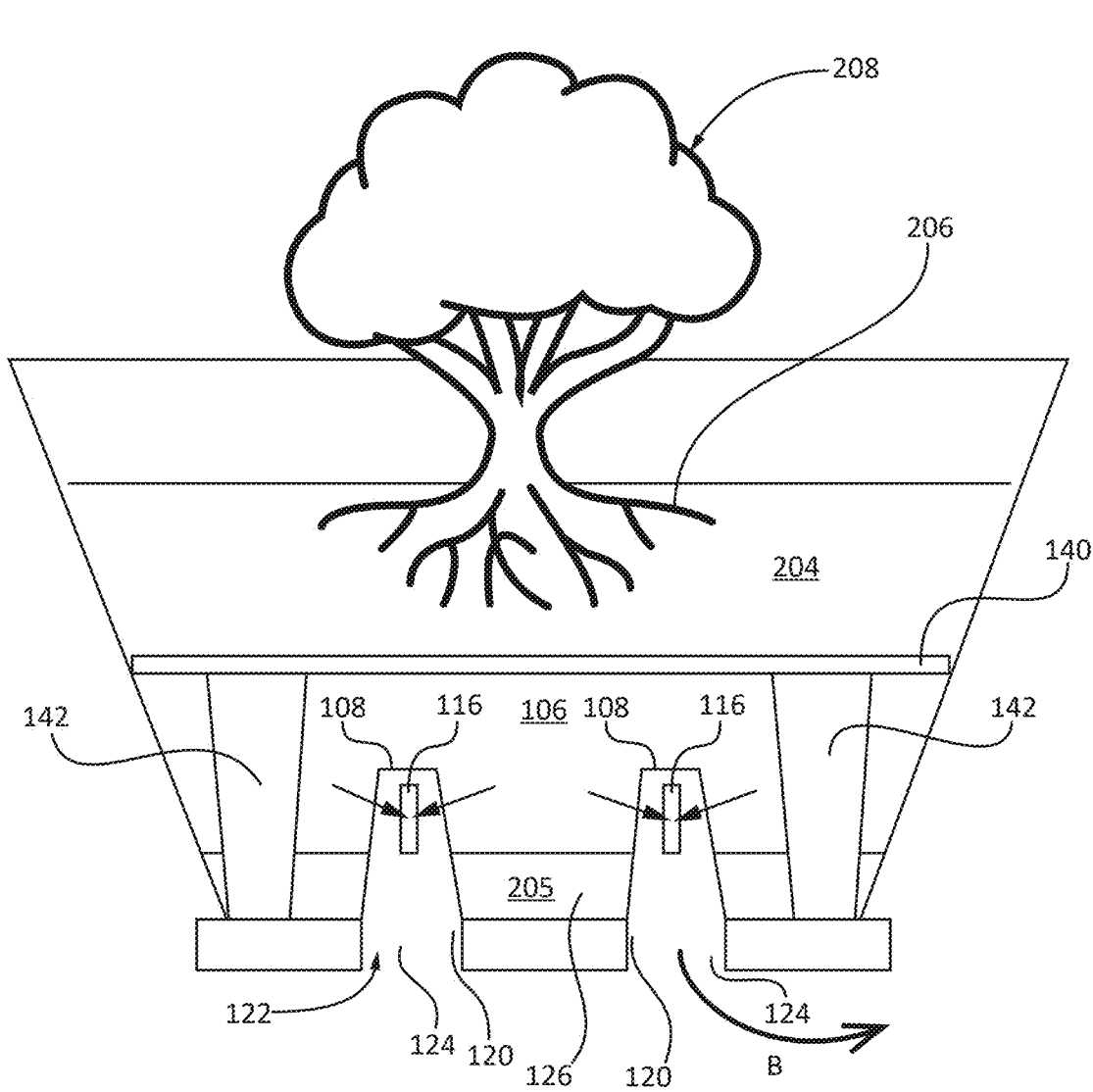
FIG. 6 is a schematic cross-sectional view of a self-watering planter showing water drainage from the bottom of the self-watering planter, in accordance with an embodiment of the present invention.

Referring to FIG. 6, for drainage, when the water level drops below the level of the slits 116, excess water 205 may flow back through the slits 116 into the drainage risers 108. From there, water may drain through the centrally disposed drainage openings 118, into the channels 120, and out through the openings 124 in the recess 122 (shown by arrow "B"). The cavity 106 of the self-watering planter includes the reservoir 126 that can store some water 205 to provide hydration to the plant 208 within the self-watering planter 100.

In embodiments featuring the tray 140, water 202 may also flow through the perforations 144 in the tray 140 and its supports 142. This may allow water to reach the soil or growing medium while preventing potted plants from sitting directly in the water collected in the reservoir 126. The described water flow paths enable efficient watering and drainage, promoting healthy root development and plant growth while helping to prevent overwatering and root rot.

The self-watering planters 100 in accordance with the present embodiments may be fabricated by molding processes using plastics; however, other materials are contemplated as well. For example, the self-watering planters 100 may include metal construction, concrete, wood, etc. In an embodiment, the self-watering planters are a monolithic construction (e.g., one piece).

In use, the reservoir 126 may be filled with water, a water-absorbing medium, gravel, soil or other materials. The reservoir 126 may be configured to receive a bottom of another planter or pot.

Figure 7:
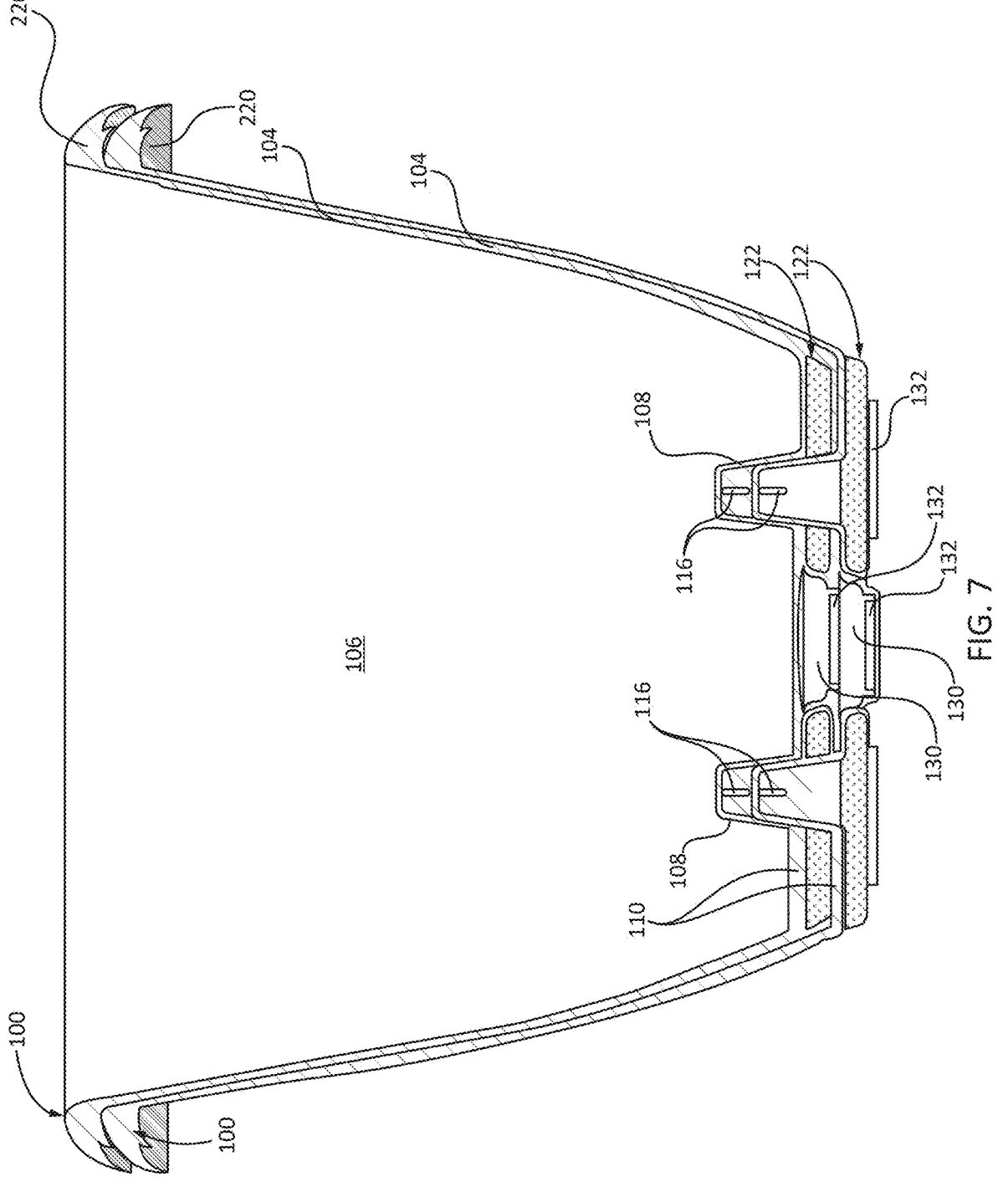
FIG. 7 is a cross-sectional view of stacked self-watering planters having nested features, in accordance with an embodiment of the present invention.

Referring to FIG. 7, a stacked or nesting configuration is shown. In the stacked or nesting configuration, multiple self-watering planters 100 may be arranged vertically to save space and facilitate storage or transport. The tapered shape of the drainage risers 108 and other portions of the self-watering planters 100 may allow them to fit partially inside one another when stacked. The drainage risers 108 may be designed with a shape that permits nesting, such as a conical or tapered polygonal form. This shape may allow one planter to fit within the cavity 106 of the planter above it without interfering with the internal structures.

When stacked, the bottom 110 of an upper self-watering planter 100 may rest on or near a rim 220 of the self-watering planter 100 below it. The feet 132 of the upper planter may provide some spacing between the stacked planters, potentially allowing for air circulation. In some configurations, the reservoir 126 of a lower planter may accommodate the bottom portion of the planter stacked above it. This arrangement may help stabilize the stack and maximize space efficiency. The nesting capability may allow for compact storage of multiple planters when not in use, which may be particularly beneficial for retail display, shipping, or off-season storage in greenhouse operations.

Having described preferred embodiments for planters with water preservation features (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is desired to be protected by Letters Patent is set forth.

What is claimed is:

1. A self-watering planter, comprising:
an interior cavity defined by a wall and a bottom surface;
at least one drainage riser extending from the bottom surface within the interior cavity, the at least one drainage riser having a centrally disposed drainage opening and at least one vertically disposed slit in fluid communication with the centrally disposed drainage opening; and
a recess formed on an external portion of the bottom surface, the recess configured to form at least one channel formed under the bottom surface when the self-watering planter interfaces with a supporting surface, wherein the centrally disposed drainage opening is in fluid communication with the at least one channel;
wherein the at least one channel provides an opening for flood floor water to enter the interior cavity and be stored in a reservoir region formed between the at least one vertically disposed slit and the bottom surface;
wherein an opening is at an end of each of the at least one channel and a cross section of the opening is larger than a cross section of the at least one channel.

2. The self-watering planter of claim 1, wherein the at least one drainage riser Includes a tapered shape.

3. The self-watering planter of claim 1, further comprising a permeable tray supported above the bottom surface and configured to receive a plant or growing medium.

4. The self-watering planter of claim 3, wherein the permeable tray includes a plurality of perforations to allow water and air flow.

5. The self-watering planter of claim 1, further comprising a centrally disposed support structure disposed in a central region on the external portion of the bottom surface, the centrally disposed support structure configured to prevent sag to maintain the at least one channel when the self-watering planter interfaces with the supporting surface.

6. The self-watering planter of claim 1, wherein the at least one vertically disposed slit includes a cross-sectional area selected to permit a drainage rate.

7. The self-watering planter of claim 1, wherein the at least one vertically disposed slit is adjustable.

8. A self-watering planter, comprising:
an interior cavity defined by a wall and a bottom surface;
a plurality of drainage risers extending from the bottom surface within the interior cavity, each drainage riser having a tapered shape, a centrally disposed drainage opening, and a plurality of vertically disposed slits in fluid communication with the centrally disposed drainage opening;
a recess formed on an external portion of the bottom surface, the recess configured to form a cross-shaped channel formed under the bottom surface when the self-watering planter interfaces with a supporting surface, wherein the centrally disposed drainage opening is in fluid communication with the cross-shaped channel;
a reservoir region formed between the bottom surface and a lower edge of each of the plurality of vertically disposed slits to store water; and
a centrally disposed support structure disposed in a central region on the external portion of the bottom surface, the centrally disposed support structure configured to prevent sag to maintain the cross-shaped channel when the self-watering planter interfaces with the supporting surface;

wherein the cross-shaped channel provides an opening for flood floor water to enter the interior cavity and be stored in the reservoir region;

wherein an opening is at an end of the cross-shaped channel and a cross section of the opening is larger than a cross section of the cross-shaped channel.

9. The self-watering planter of claim 8, wherein the plurality of drainage risers is arranged symmetrically around a center of the bottom surface.

10. The self-watering planter of claim 8, wherein the recess includes openings at ends of the cross-shaped channel that are larger than the cross-shaped channel to facilitate water flow.

11. The self-watering planter of claim 8, further comprising peripheral supports disposed on the external portion of the bottom surface, wherein the peripheral supports and the centrally disposed support structure include feet to provide stability and extend a clearance distance with the supporting surface.

12. The self-watering planter of claim 8, further comprising a permeable tray supported above the bottom surface and configured to receive a plant or growing medium, the permeable tray including a plurality of perforations to allow water and air flow.

13. The self-watering planter of claim 12, wherein the plurality of drainage risers includes conical shapes and extend from the bottom surface to a height below the permeable tray.

14. The self-watering planter of claim 8, wherein the plurality of vertically disposed slits include a cross-sectional area selected to permit a drainage rate.

15. The self-watering planter of claim 8, wherein the plurality of vertically disposed slits are adjustable.

16. A self-watering planter, comprising:

an interior cavity defined by a wall and a bottom surface;

a plurality of conical drainage risers extending from the bottom surface within the interior cavity, each drainage riser having a centrally disposed drainage opening and vertically disposed slits in fluid communication with the centrally disposed drainage opening;

a cross-shaped recess formed on an external portion of the bottom surface, the cross-shaped recess configured to form a cross-shaped channel formed under the bottom surface when the self-watering planter interfaces with a supporting surface, wherein each centrally disposed drainage opening is in fluid communication with the cross-shaped channel;

a reservoir region formed between the bottom surface and a lower edge of the vertically disposed slits to store water;

a permeable tray supported above the bottom surface by a plurality of supports and configured to receive a plant or growing medium, the permeable tray including a plurality of perforations to allow water and air flow;

a centrally disposed support structure disposed in a central region on the external portion of the bottom surface within the cross-shaped recess, the centrally disposed support structure configured to prevent sag to maintain the cross-shaped channel when the self-watering planter interfaces with the supporting surface; and peripheral supports disposed on the external portion of the bottom surface, wherein the peripheral supports and the centrally disposed support structure include feet to provide stability and extend a clearance distance with the supporting surface;

wherein the cross-shaped channel provides an opening for flood floor water to enter the interior cavity and be stored in the reservoir region;

wherein an opening is at an end of the cross-shaped channel and a cross section of the opening is larger than a cross section of the cross-shaped channel.

17. The self-watering planter of claim 16, wherein the plurality of conical drainage risers is arranged symmetrically around a center of the bottom surface.

18. The self-watering planter of claim 16, wherein the cross-shaped recess includes openings at ends of the cross-shaped channel that are larger than the cross-shaped channel to facilitate water flow.

19. The self-watering planter of claim 16, wherein the vertically disposed slits include a cross-sectional area selected to permit a drainage rate.

20. The self-watering planter of claim 16, wherein the permeable tray is removable from the interior cavity.

* * * * *